United States Patent
Feiertag

(10) Patent No.: US 7,181,990 B2
(45) Date of Patent: Feb. 27, 2007

(54) POSITIONING DEVICE FOR A TELESCOPING STEERING COLUMN

(75) Inventor: Alan Dale Feiertag, Emmaus, PA (US)

(73) Assignee: Mack Trucks, Inc., Allentown, PA (US)

( * ) Notice: Subject to any disclaimer, the term of this patent is extended or adjusted under 35 U.S.C. 154(b) by 601 days.

(21) Appl. No.: 10/653,291

(22) Filed: Sep. 3, 2003

(65) Prior Publication Data

US 2004/0051291 A1 Mar. 18, 2004

Related U.S. Application Data

(60) Provisional application No. 60/410,801, filed on Sep. 16, 2002.

(51) Int. Cl.
*B62D 1/18* (2006.01)

(52) U.S. Cl. ......................................... 74/493; 280/777

(58) Field of Classification Search ................... 74/493; 280/777
See application file for complete search history.

(56) References Cited

U.S. PATENT DOCUMENTS

| | | | |
|---|---|---|---|
| 2,845,810 A | 8/1958 | Sampson | |
| 3,318,170 A | 5/1967 | Runkle | |
| 3,386,309 A | 6/1968 | Reed et al. | |
| 3,604,285 A * | 9/1971 | Olsson | 74/492 |
| 3,788,148 A * | 1/1974 | Connell et al. | 74/492 |
| 3,797,276 A * | 3/1974 | Orain | 464/167 |
| 4,509,386 A | 4/1985 | Kimberlin | |
| 4,774,851 A * | 10/1988 | Iwanami et al. | 74/493 |
| 4,796,481 A | 1/1989 | Nolte | |
| 4,900,059 A | 2/1990 | Konishita et al. | |
| 5,984,354 A * | 11/1999 | Kim | 280/777 |
| 6,293,872 B1 * | 9/2001 | Ganser | 464/167 |
| 6,382,670 B2 * | 5/2002 | Badaire et al. | 280/777 |
| 6,957,727 B2 * | 10/2005 | Leung | 188/371 |
| 2001/0018369 A1 | 8/2001 | Cermak et al. | |

FOREIGN PATENT DOCUMENTS

JP 55-127256 * 10/1980

* cited by examiner

*Primary Examiner*—William C. Joyce
(74) *Attorney, Agent, or Firm*—Rothwell, Figg, Ernst & Manbeck, P.C.

(57) ABSTRACT

A positioning device for a telescoping steering column includes a steering shaft having an upper steering shaft section disposed slidably on a lower steering shaft section and a lower steering shaft housing disposed around the lower steering shaft, an upper steering shaft housing disposed slidably on the lower steering shaft housing substantially parallel to an axis of rotation of the steering shaft, the upper steering shaft housing disposed fixedly around the upper steering shaft, a lower housing plate disposed fixedly on the lower housing, a slider plate corresponding to the lower housing plate disposed fixedly on the upper housing, an anti-friction element disposed movably between the lower housing plate and the slider plate, and a positioning rib disposed fixedly in the slider plate or the lower housing plate substantially normal to the axis to limit a translation of the anti-friction element when the steering column is telescoped.

15 Claims, 7 Drawing Sheets

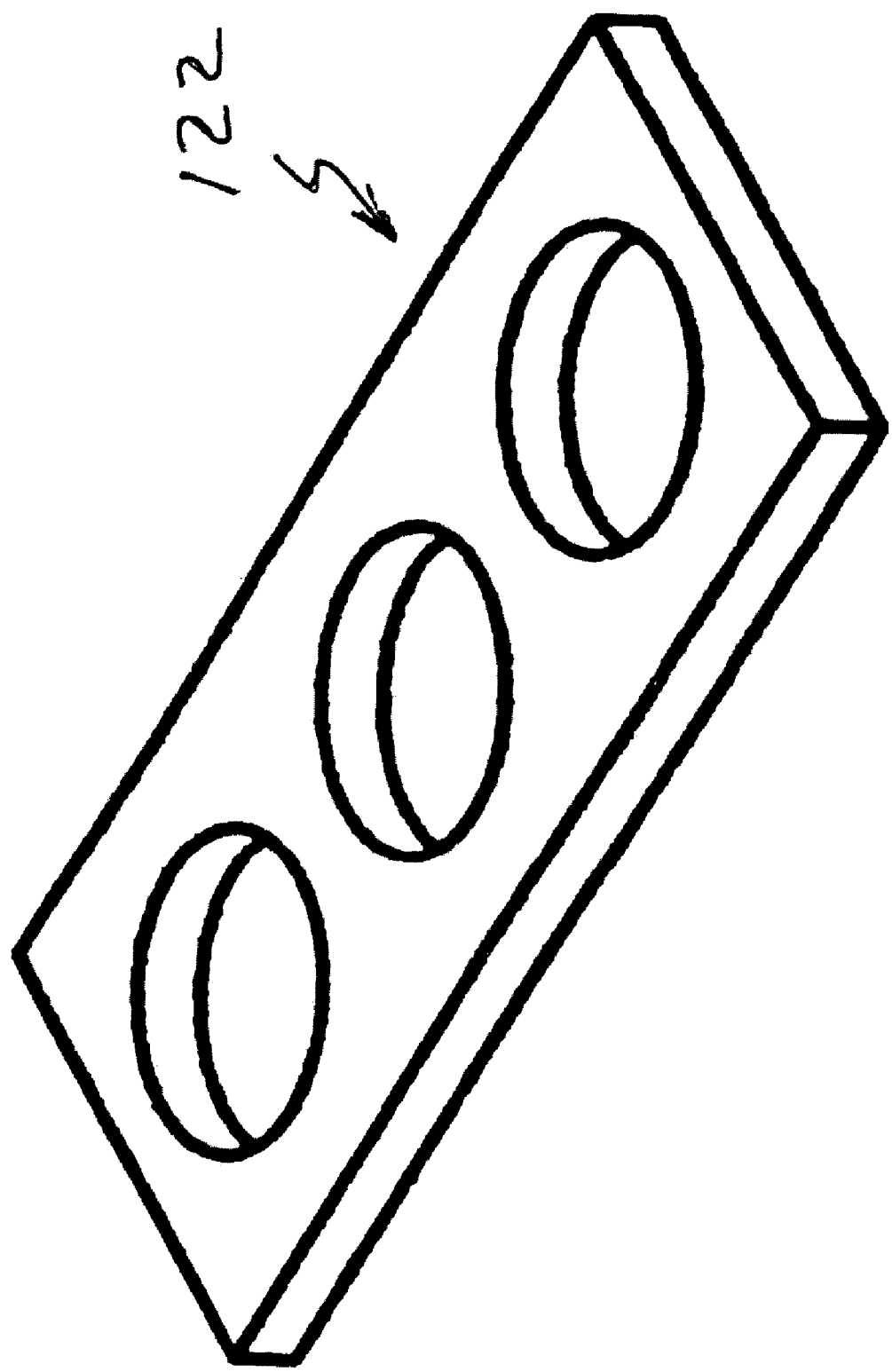

POSITIONING DEVICE FOR A TELESCOPING STEERING COLUMN

CROSS-REFERENCE TO RELATED APPLICATIONS

This application claims priority to Provisional Application Ser. No. 60/410,801, filed Sep. 16, 2002, the disclosure of which is incorporated by reference.

FIELD OF THE INVENTION

The invention relates to steering columns in general, and telescoping steering columns in particular.

DESCRIPTION OF THE RELATED ART

Drivers of cars, trucks, and automotive vehicles come in various shapes and sizes. Some drivers are taller than others, and some drivers may have longer arms and legs than others. Some seats translate forward and back to accommodate drivers of various sizes. Some seats may move up and down as well. If the seat is moved backward or upward, however, the seat will end up further away from the steering wheel. Thus if the steering wheel stays in one place relative to the seat, it may become difficult for some drivers to reach.

Since moving the seat further away from the steering wheel may make the steering wheel difficult to reach for some drivers, the steering wheel itself is often made mobile as well. Some steering columns may be adjustable to allow drivers of various sizes to reach the steering wheel comfortably. Steering wheels may, for example hinge about a joint at the end of the steering shaft. A steering wheel that hinges may allow a driver to adjust the steering wheel at different orientations ranging from nearly horizontal to nearly vertical.

Steering columns may also be made to telescope. A height of a steering wheel on a telescoping steering column may thus be made to be adjustable relative to the seat. Telescoping steering columns, in particular, are used in to allow a height of a steering wheel to be adjusted to suit various drivers. A driver may raise a steering wheel in a vehicle with a telescoping steering column upon entering the vehicle, making it easier to slide underneath. Then the steering wheel may be lowered to a comfortable position for driving.

The ease with which the steering wheel can be raised or lowered may be readily apparent to the driver. The ease with which the steering wheel can be raised or lowered may thus implicate the driver's impression of the quality of the vehicle, A steering wheel on a telescoping steering column should move with minimal effort.

Furthermore, the steering wheel should move into position with a firm, solid, feel, and snap into or out of each detente without slipping or binding. If the steering wheel feels stiff or difficult to move the driver may not like it as much. Finally, the steering column should maintain its concentricity. Nothing unnerves a driver like a steering wheel that precesses around its axis.

A telescoping steering column may include a steering shaft running in a housing. The housing surrounds the steering shaft and serves a decorative function as well as providing a platform for turn signal, hazard, and high-beam light switches, as well as windshield wiper and transmission stalks.

A steering column is generally free-standing. Since a steering column is free-standing, it may be cantilevered at the firewall. A steering column may therefore receive support only from the firewall. Furthermore, the upper haves of the steering shaft and the housing of a telescoping steering column may receive support from the lower halves only. Any interface between the upper and lower halves of the steering shaft and housing may thus need to transmit a bending moment from the lower halves to the upper, to keep them from falling off into the driver's lap.

Both the steering shaft and the housing must generally be collapsible for the steering column to telescope. The upper and lower halves of the steering shaft may be connected by a spline. The splined connection may transmit steering torque from the upper half to the lower while also allowing the upper half of the steering column to translate up and down relative to the lower half.

The spline may also be relied on to transmit the bending moment from the lower half to the upper half, although the housing may fulfill that requirement by supporting the upper half of the steering shaft as well. In fact, a bending moment applied to the spline may cause the spline to bind, so it's better if spline transmits no bending moment.

The housing around the steering shaft, on the other hand, will not generally need to turn with the steering shaft. The steering shaft, rather, may run in bearings within the housing. The upper half of the housing may be cantilevered relative to the lower half, and thus simply slide relative to the lower half in a direction parallel to the axis of rotation of the steering shaft. Furthermore, since the upper half of the housing is cantilevered to the lower half, there may be overlap between the upper and the lower housing to transmit a bending moment from the lower housing to the upper housing.

Furthermore, since the upper half of the housing slides relative to the lower half when the steering column telescopes, there may be a varying amount of overlap between the upper and the lower housing. Since there may be a varying amount of overlap, the interface may be quite long when the housing is extended fully, and shorter when the housing is telescoped.

Since the upper housing needs to transmit no steering torque to the lower housing, the interface between the upper and lower halves may be an anti-friction interface, such as a through bearings. The bearings of the interface may need to move closer or further apart when the position of the upper half of the housing is adjusted relative to that of the lower half of the housing. The bearings of the interface may therefore need to be provided with a range of movement between their position when the upper half of the housing is extended relative to the lower half of the housing, and when it is retracted.

The ease with which the steering wheel can be raised or lowered may be readily apparent to the driver. The ease with which the steering wheel can be raised or lowered may thus implicate the driver's impression of the quality of the vehicle. A steering wheel on a telescoping steering column should move with minimal effort.

Furthermore, the steering wheel should move into position with a firm, solid, feel, and snap into or out of each detente without slipping or binding. If the steering wheel feels stiff or difficult to move the driver may not like it as much. Furthermore, the steering column should maintain its concentricity. Nothing unnerves a driver like a steering wheel that precesses around its axis.

The wheels of a vehicle may be turned by pushing on steering arms to rotate them about substantially vertical axes. Translational motion is required to push the steering arms. The rotational motion of a steering shaft may be converted to translational motion with a worm-and-sector or rack-and-pinion. The translational motion may then be transferred to the steering arms with Panhard rods.

The steering arms, Panhard rods, and worm-and sector may all be relatively rigid. Since they are rigid, they may impart vibration from the tires to the steering shaft as well. Although some of the vibration may be damped by, for example, viscous dampers like power steering fluid, sufficient vibration may reach the steering shaft to vibrate the steering column. A telescoping steering column may be susceptible to vibration if the interfaces are not sufficiently rigid to support the upper half of the housing and steering shaft.

SUMMARY OF THE INVENTION

In a first aspect of the invention, a positioning device for a telescoping steering column includes a steering shaft having an upper and a lower section and an axis of rotation, the upper steering shaft section disposed slidably on the lower steering shaft section substantially parallel to the axis, the lower steering shaft disposed rotatably within a lower steering shaft housing, an upper steering shaft housing disposed slidably on the lower steering shaft housing substantially parallel to the axis, the upper steering shaft disposed rotatably within the upper steering shaft housing, a lower housing plate disposed fixedly on the lower housing, a slider plate corresponding to the lower housing plate disposed fixedly on the upper housing, an anti-friction element disposed movably between the lower housing plate and the slider plate, and a positioning rib disposed fixedly in the slider plate substantially normal to the axis to limit a translation of the anti-friction element when the steering column is telescoped.

In a second aspect of the invention, a positioning device for a telescoping steering column includes a steering shaft having an upper and a lower section and an axis of rotation, the upper steering shaft section disposed slidably on the lower steering shaft section substantially parallel to an axis of the steering column, a lower steering shaft housing disposed fixedly around the lower steering shaft, an upper steering shaft housing disposed slidably on the lower steering shaft housing substantially parallel to the axis, the upper steering shaft housing disposed fixedly around the upper steering shaft, a lower housing plate disposed fixedly on the lower housing, a slider plate corresponding to the lower housing plate disposed fixedly on the upper housing, an anti-friction element disposed movably between the lower housing plate and the slider plate, and a positioning rib disposed fixedly substantially normal to the axis in the lower housing plate to limit a translation of the anti-friction element when the steering column is telescoped.

In a third aspect of the invention, a positioning device for a telescoping steering column includes a steering shaft having an upper and a lower section and an axis of rotation, first means for sliding the upper steering shaft section relative to the lower steering shaft section, the lower steering shaft disposed rotatably within a lower steering shaft housing, the upper steering shaft disposed rotatably within an upper steering shaft housing, second means for sliding the lower steering shaft housing relative to the upper steering shaft housing, and a positioning rib disposed fixedly in the slider plate substantially normal to the axis to limit a translation of the second means for sliding when the steering column is telescoped.

BRIEF DESCRIPTION OF THE SEVERAL VIEWS OF THE DRAWINGS

FIG. 7 shows a bearing race for use with the embodiment shown in FIG. 2.

DETAILED DESCRIPTION OF THE PREFERRED EMBODIMENTS

Figure 1:
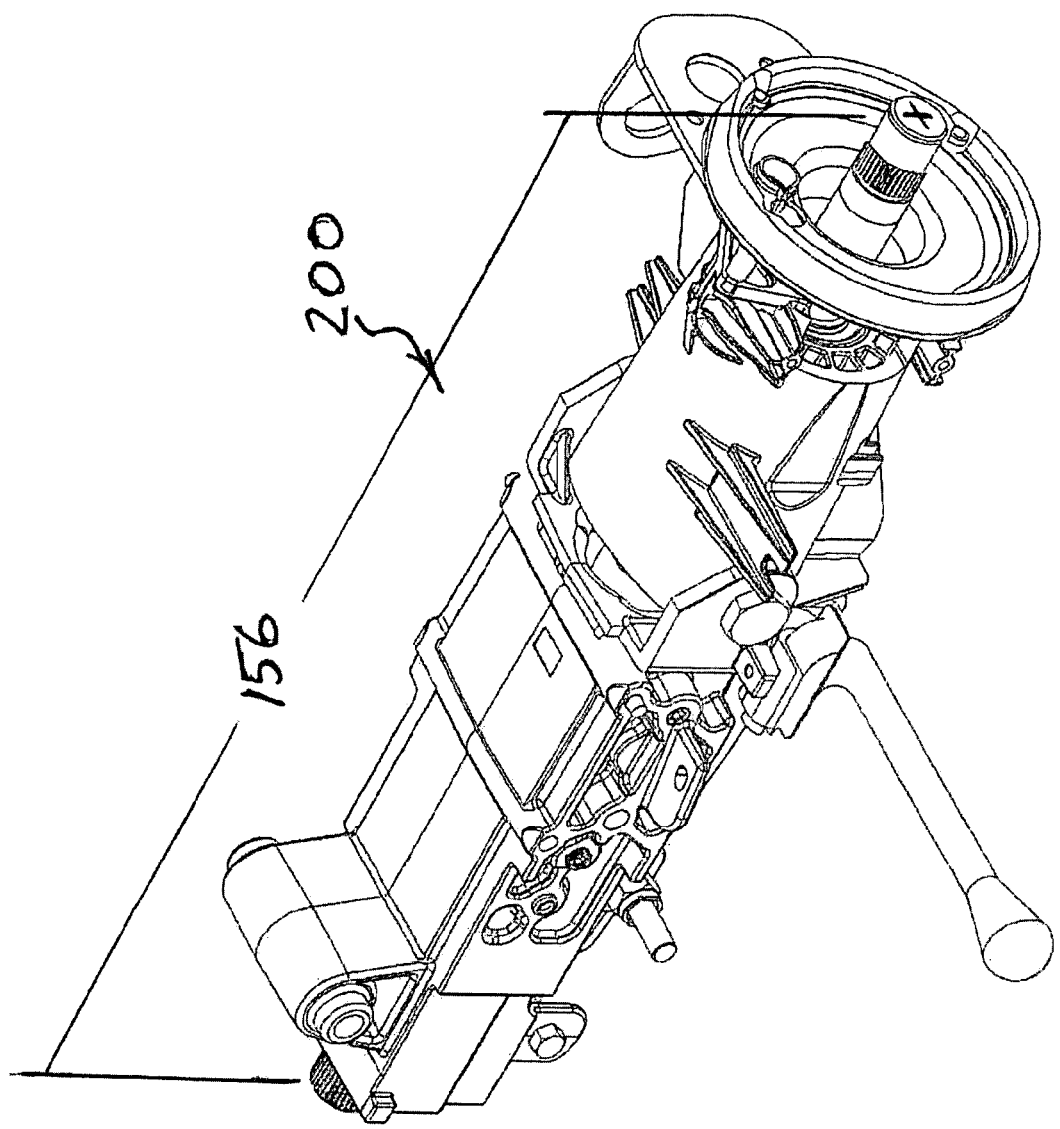
FIG. 1 shows a three quarter view of a telescoping steering column for use with an embodiment of the invention.

Since the ease with which the steering wheel may be raised and lowered may have an immediate impact on the driver's impression of the quality of the vehicle, it would be desirable for the steering wheel to be easy to raise and lower. It would further be desirable for the steering wheel to move smoothly between detents, and snap firmly into each detente with a solid feel. Finally, it would be desirable for the steering wheel to maintain concentricity about the axis of the steering shaft.

Since the upper housing slides by the lower housing at the interface when the steering wheel is raised or lowered, it would be desirable if the interface glided smoothly, without excessive friction or binding. Since friction may be proportional to a force normal to a surface of the interface, it would be desirable if the force were distributed over the surface, rather than concentrated. It would further be desirable if bearings used in the interface were maintained in separate races. Finally, it would be desirable if the bearings were able to avail themselves of separate ranges of motion to accommodate both a fully extended and a fully retracted steering column, without interfering with each other.

Since the upper housing is cantilevered to the lower housing at the interface, it would be desirable if the interface could distribute the bending moment along the interface so that a force normal to the surface of the interface was distributed, and binding of the interface was minimized. Furthermore, it would be desirable if the bearings in the interface were able to distribute the bending moment along the interface for both a fully extended and a fully retracted steering column. Finally, it would be desirable if the bearings in the interface were able to transition smoothly between distributing the bending moment along the interface from a fully extended position of the steering column and a fully retracted position of the steering column.

Since the bearings at an interface need a range of motion to accommodate a steering column that is fully extended as well as fully retracted, it would be desirable if the ranges of motion of disparate bearings or bearing sets could be kept separate from one another with a positioning rib so that the risk of bearings binding with one another was minimized.

Since the telescoping steering column may be susceptible to vibration if the interfaces are not sufficiently rigid to support the upper half of the housing and steering shaft, it would be desirable if the interface were rigid. Since the rigidity of the interface may be maximized by separating the bearings in the interface, it would be desirable if the bearings were distributed as widely as possible.

Furthermore, since motion is driven by force, it would be desirable if the forces imparted to the upper half of the steering column were distributed along the interface so that a force normal to the surface of the interface was distributed. Furthermore, it would be desirable if the bearings in the interface were able to distribute the bending moment along the interface for both a fully extended and a fully retracted steering column.

In FIG. 1 is shown a telescoping steering column 200 to which a positioning device according to a first embodiment of the invention may be installed. The positioning device may be used to ease the adjustment of a length 156 of telescoping steering column 200.

Telescoping steering column 200 may be installed in a truck. Telescoping steering column 200 may be adjustable to suit drivers of various heights. Telescoping steering column 200 may include a switch or lever to lock telescoping steering column 200 at a particular length.

Figure 2:
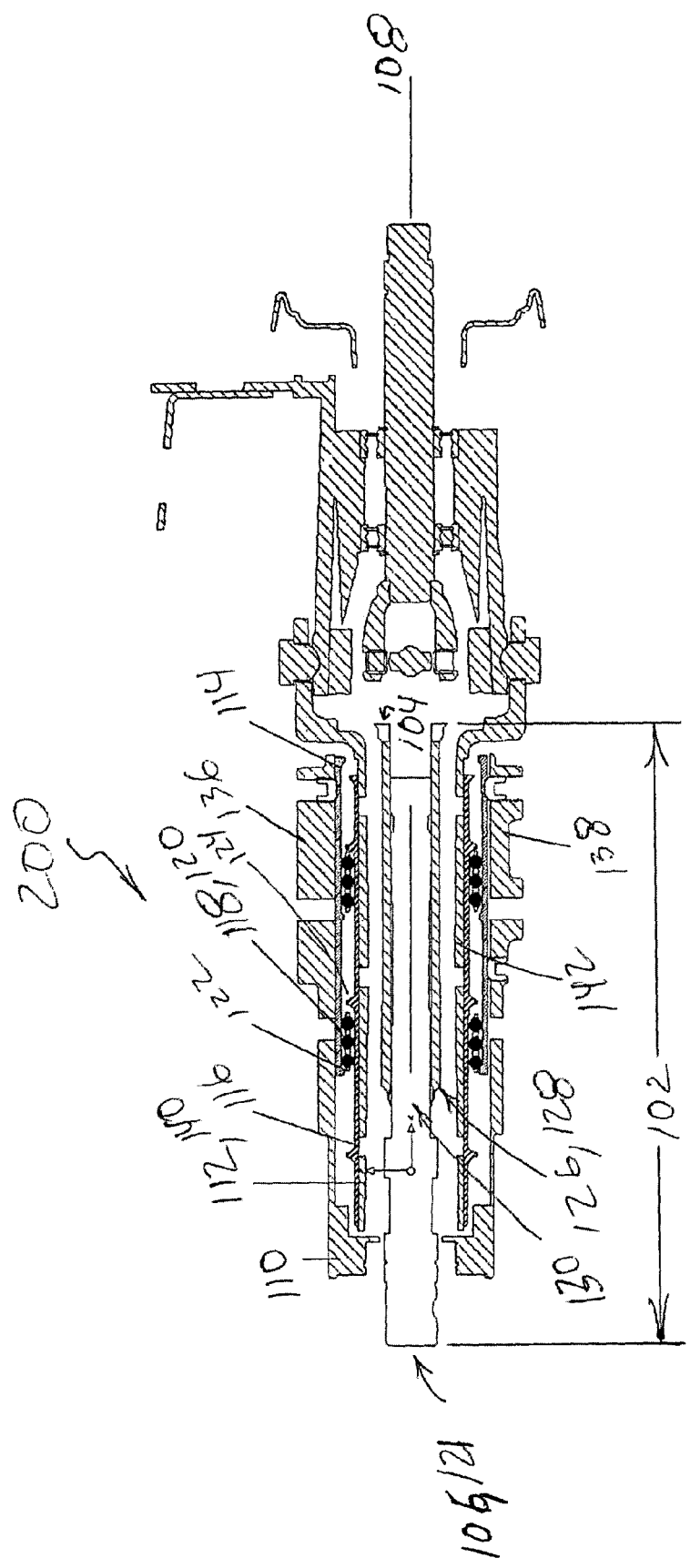
FIG. 2 shows a section through a telescoping steering column according to an embodiment of the invention.

In FIG. 2 is shown a section through telescoping steering column 200. Telescoping steering column 200 may include a steering shaft 121 having an upper and a lower sections 104, 106 and an axis of rotation 108. Steering shaft 121 may connect a steering wheel to a steering gear. Upper steering shaft section 104 may slide relative to lower steering shaft section 106 when steering column 200 is telescoped. Upper steering shaft section 104 may slide in a direction substantially parallel to axis 108.

Figure 3:
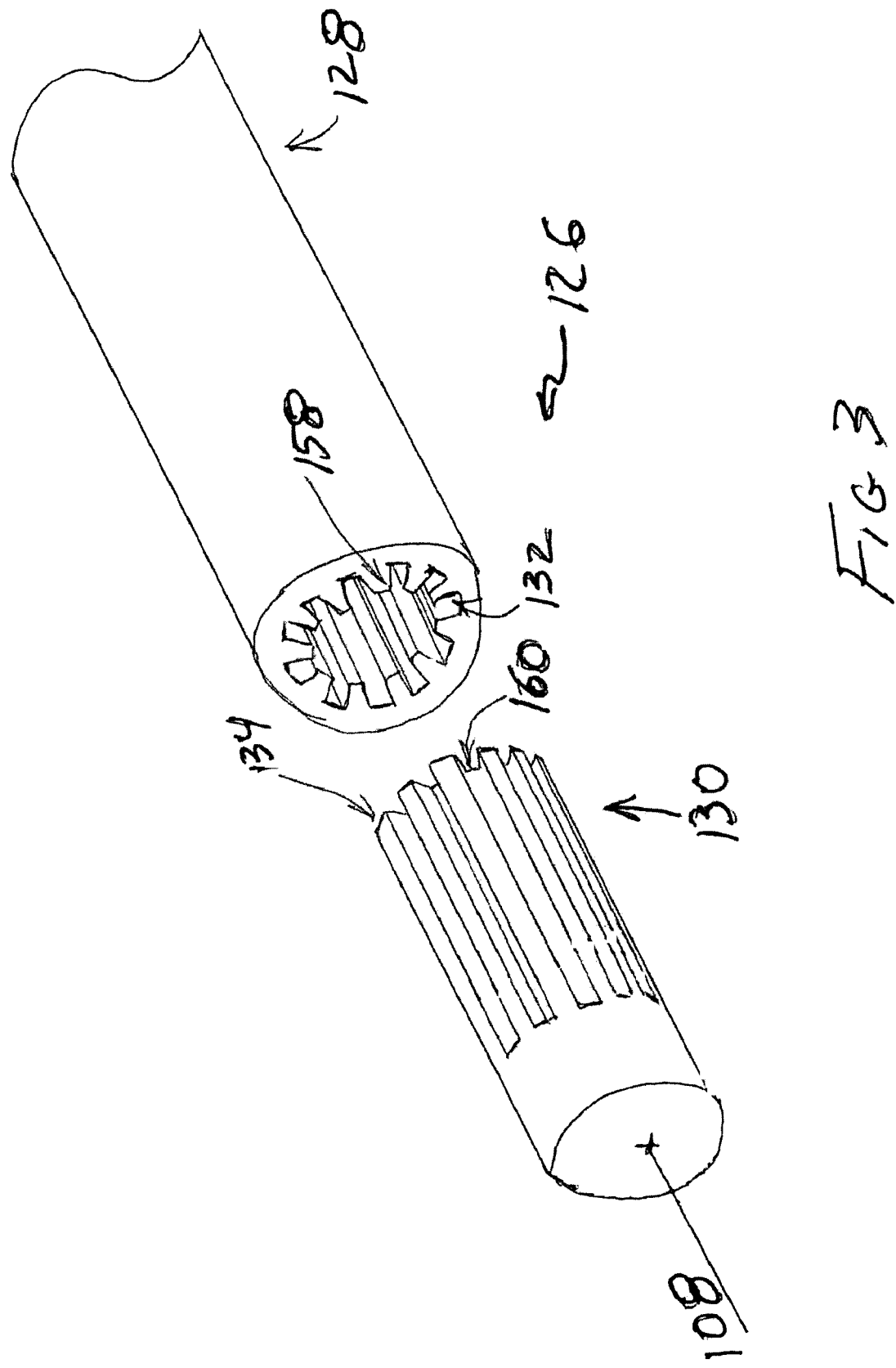
FIG. 3 shows a spline for use with the embodiment shown in FIG. 2.

In one embodiment, upper steering shaft section 104 may be splined to lower steering shaft section 106 using a spline 126. Spline 126, shown in FIG. 3, may include a female element 128 disposed fixedly to upper steering shaft section 104 and a male element 130 disposed fixedly to lower steering shaft section 106. Male element 130 may be disposed insertably within female element 128, such that male element 130 moves axially relative to female element 128, but may not rotate relative to female element 128. Male element 130 may thus impart rotational motion to female element 128, while allowing a length of steering shaft 102 to change.

In one embodiment, female element 128 may have internal grooves 132. Grooves 132 may be disposed around an inner surface of female element 128 and be substantially parallel to axis 108. Male element 130 may have teeth 134 with which grooves 132 mesh when male element 130 is inserted in female element 128.

In an alternative embodiment, female element 128 may have teeth 158 disposed around an inner surface of female element 128 and substantially parallel to axis 108. Male element 130 may have internal grooves 160 with which teeth 158 mesh when male element 130 is inserted in female element 128.

Figure 4:
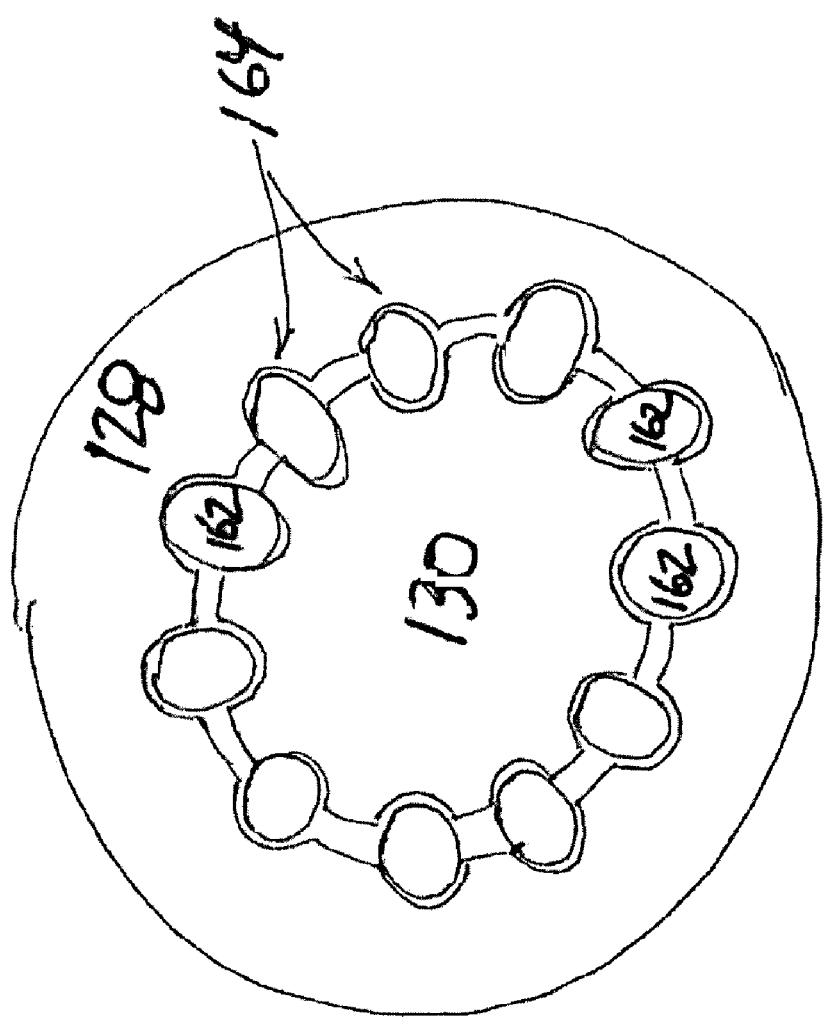
FIG. 4 shows a section through a second embodiment of the spline shown in FIG. 3.

Teeth 134 may be disposed around an external surface of male element 130. Teeth 134 may be substantially parallel to axis 108 as well. Teeth 134 may have a profile substantially similar to a profile of grooves 132 such that teeth 134 fit within grooves 132 with a minimum of chatter and lash. In one embodiment, a profile of teeth 134 may be substantially complementary to a profile of grooves 132 such that the labels "teeth" and "grooves" are interchangeable. In one embodiment, as shown in FIG. 4, teeth 134 may be replaced by bearings 162 running in grooves 164. In this embodiment, the bearings may be ball bearings, and male element 130 may have grooves corresponding to grooves 132.

Telescoping steering column 200 may also include a lower steering shaft housing 110 disposed around lower steering shaft section 106. Lower steering shaft housing 110 may be cantilevered from the fire wall, and lower steering shaft section 106 may rotate in bearings supported by the fire wall or lower steering shaft housing 110.

An upper steering shaft housing 112 may be disposed around upper steering shaft section 104. Upper steering shaft section 104 may rotate in bearings supported by upper steering shaft housing 112.

Upper steering shaft housing 112 may slide relative to lower steering shaft housing 110 when steering column 200 is telescoped, allowing upper steering shaft section 104 to slide relative to lower steering shaft section 106 as well. Upper steering shaft housing 112 may slide substantially parallel to axis 108.

Figure 5:
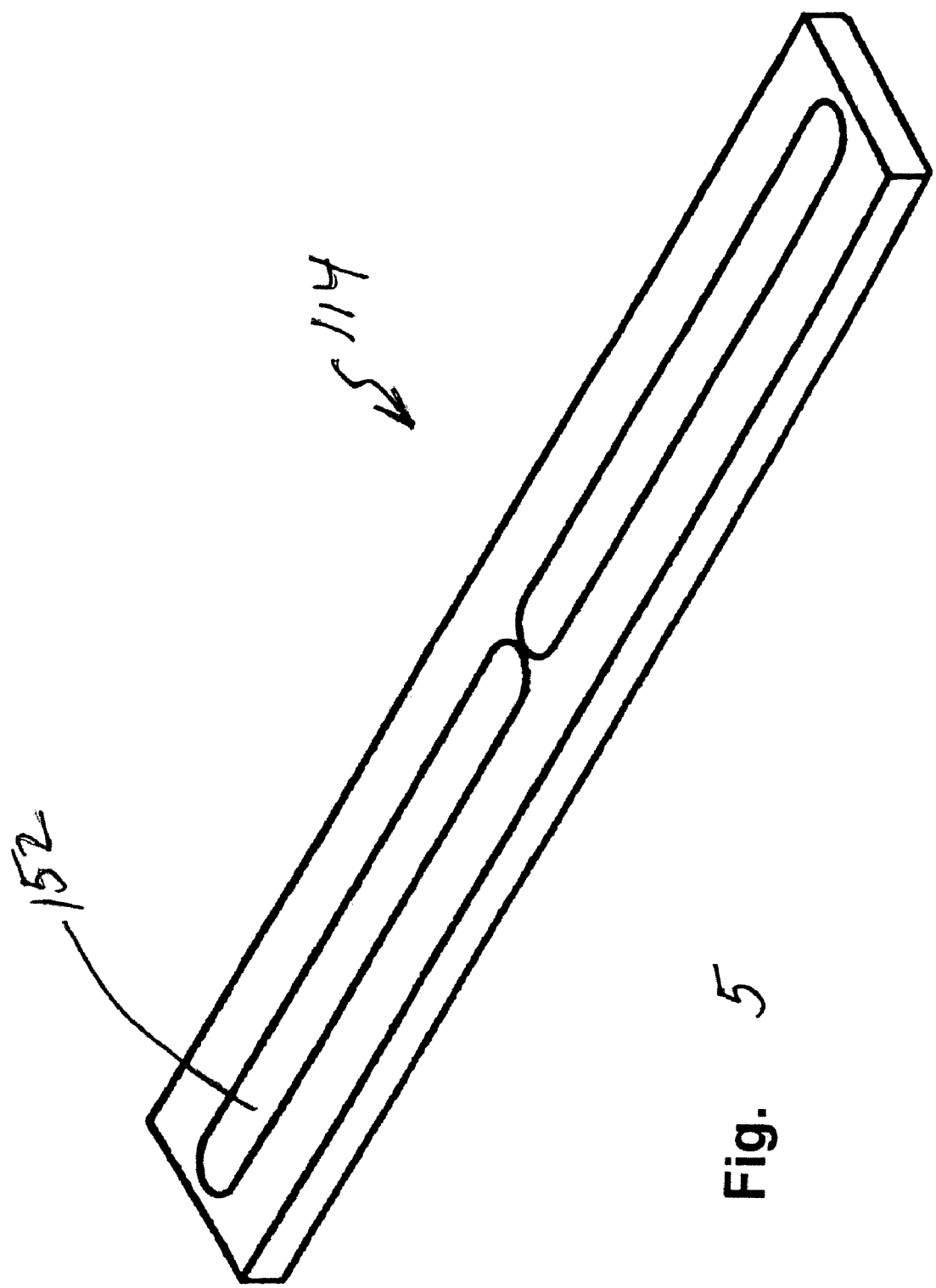
FIG. 5 shows a lower housing plate for use with the embodiment shown in FIG. 2.
Figure 6:
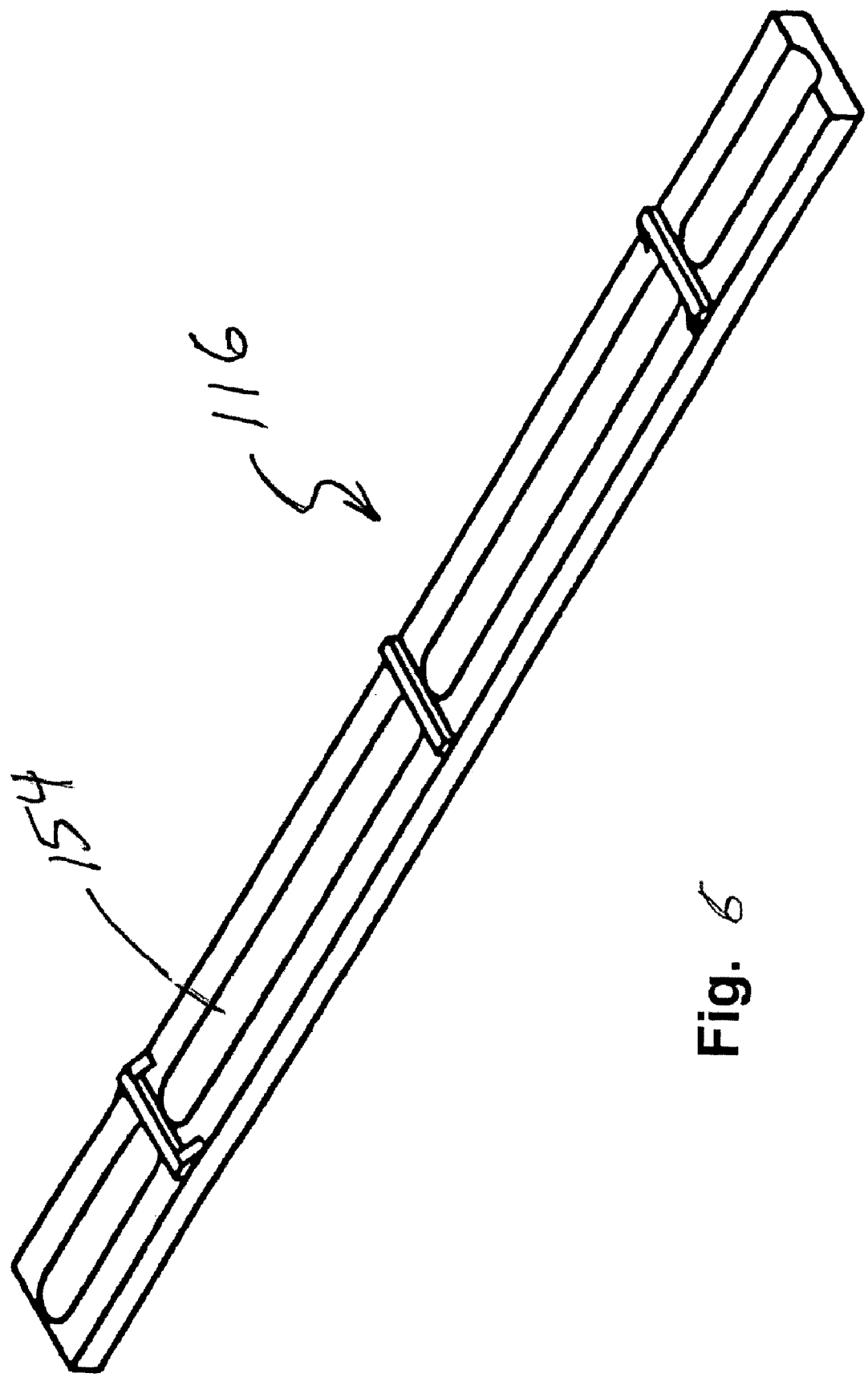
FIG. 6 shows a slider plate for use with the embodiment shown in FIG. 2.

A lower housing plate 114, as shown in FIG. 5, may be disposed fixedly on lower housing 110, and a slider plate 116, as shown in FIG. 6, corresponding to lower housing plate 114 may be disposed fixedly on upper housing 112. In one embodiment, lower housing plate 114 may be disposed fixedly on an upper or a lower side 136, 138 of lower housing 110, and slider plate 116 may be disposed fixedly on an upper or a lower side 140, 142 of upper housing 112.

In another embodiment, lower housing plate 114 may be disposed fixedly on an upper or a lower side 144, 146 of lower housing 110, and slider plate 116 may be disposed fixedly on an upper or a lower side 148, 150 of upper housing 112.

An anti-friction element 118 may be disposed movably between lower housing plate 114 and slider plate 116. In one embodiment, anti-friction element 118 includes a plurality of bearings 120 disposed rollably within a race 122, shown in FIG. 7. In various embodiments, bearings 120 may be ball bearings, roller bearings, or needle bearings. In one embodiment, a plurality of bearings 120 may be disposed rollably in a groove 152 in lower housing plate 114. In one embodiment, a plurality of bearings 120 may be disposed rollably in a groove 154 in slider plate 116.

A positioning rib 124 may be disposed fixedly in lower housing plate 114 or slider plate 116 substantially normal to axis 108 to limit a translation of anti-friction element 118 when steering column 200 is telescoped. In one embodiment, anti-friction element 118 may be one of a plurality of anti-friction elements 118. In this embodiment, a first of anti-friction elements 118 may be separated from a second anti-friction element 118 by positioning rib 124.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A positioning device for a telescoping steering column comprising:

a steering shaft having an upper and a lower section and an axis of rotation;

said upper steering shaft section disposed slidably on said lower steering shaft section substantially parallel to said axis;

said lower steering shaft disposed rotatably within a lower steering shaft housing;

an upper steering shaft housing disposed slidably on said lower steering shaft housing substantially parallel to said axis, said upper steering shaft disposed rotatably within said upper steering shaft housing, wherein said upper steering shaft housing is slidable in a direction substantially parallel to said axis;

a lower housing plate disposed fixedly on said lower housing;

a slider plate corresponding to said lower housing plate disposed fixedly on said upper housing;

an anti-friction element disposed movably between said lower housing plate and said slider plate; and a positioning rib disposed fixedly in said slider plate substantially normal to said axis to limit a translation of said anti-friction element when said steering column is telescoped.

2. The positioning device of claim 1, comprising further a second anti-friction element, and wherein said anti-friction element and said second anti-friction element are separated by said positioning rib.

3. The positioning device of claim 1, wherein said anti-friction element comprises a plurality of bearings disposed rollably within a race.

4. The positioning device of claim 3, wherein said bearings are selected from the group consisting of:
   ball bearings,
   roller bearings, and
   needle bearings.

5. The positioning device of claim 3, wherein said plurality of bearings is disposed rollably in a groove in said lower housing plate.

6. The positioning device of claim 3, wherein said plurality of bearings is disposed rollably in a groove in said slider plate.

7. The positioning device of claim 1, wherein said upper steering shaft section is splined to said lower steering shaft section.

8. The positioning device of claim 7, wherein said spline comprises:
   a female element disposed fixedly to said upper steering shaft section;
   a male element disposed fixedly to said lower steering shaft section; and
   wherein said male element is disposed insertably within said female element.

9. The positioning device of claim 8, comprising further:
   grooves disposed internally to said female element substantially parallel to said axis;
   teeth disposed externally to said male element substantially parallel to said axis; and wherein said teeth are disposed meshably within said grooves.

10. The positioning device of claim 1, wherein said lower housing plate is disposed fixedly on an upper or a lower inner side of said lower housing; and said slider plate is disposed fixedly on an upper or a lower outer side of said upper housing.

11. A positioning device for a telescoping steering column comprising:

a steering shaft having an upper and a lower section and an axis of rotation;

said upper steering shaft section disposed slidably on said lower steering shaft section substantially parallel to said axis;

said lower steering shaft disposed rotatably within a lower steering shaft housing;

an upper steering shaft housing disposed slidably on said lower steering shaft housing substantially parallel to said axis, said upper steering shaft disposed rotatably within said upper steering shaft housing, wherein said upper steering shaft housing is slidable in a direction substantially parallel to said axis;

a lower housing plate disposed fixedly on said lower housing;

a slider plate corresponding to said lower housing plate disposed fixedly on said upper housing;

an anti-friction element disposed movably between said lower housing plate and said slider plate; and a positioning rib disposed fixedly in said lower housing plate substantially normal to said axis to limit a translation of said anti-friction element when said steering column is telescoped.

12. The positioning device of claim 11, comprising further a second anti-friction element, and wherein said anti-friction element and said second anti-friction element are separated by said positioning rib.

13. The positioning device of claim 11, wherein said anti-friction element comprises a plurality of bearings disposed rollably within a race.

14. The positioning device of claim 13, wherein said bearings are selected from the group consisting of:
   ball bearings,
   roller bearings, and
   needle bearings.

15. The positioning device of claim 11, wherein said lower housing plate is disposed fixedly on an upper or a lower inner side of said lower housing; and said slider plate is disposed fixedly on an upper or a lower outer side of said upper housing.

* * * * *